A. S. HESS.
SELF CLEANING RAKE.
APPLICATION FILED APR. 4, 1910.

974,268.

Patented Nov. 1, 1910.

Alfred S. Hess, Inventor

Witnesses
Rose Holstene
Joseph M. Gruber

By George ............ Attorney

THE NORRIS PETERS CO., WASHINGTON, D. C.

UNITED STATES PATENT OFFICE.

ALFRED S. HESS, OF MILWAUKEE, WISCONSIN.

SELF-CLEANING RAKE.

974,268. Specification of Letters Patent. Patented Nov. 1, 1910.

Application filed April 4, 1910. Serial No. 553,431.

*To all whom it may concern:*

Be it known that I, ALFRED S. HESS, of Milwaukee, Wisconsin, have invented a Self-Cleaning Rake, of which the following is a specification.

This invention relates to rakes of all kinds, and the object which I have in view is to provide a self-cleaning attachment for a rake for the purpose of freeing the teeth thereof from fibers, leaves, etc., which from time to time become entangled therein. More particularly I aim to provide such an attachment, simple, cheap and effective, without the use of any springs and acting by gravity and manipulation only.

Secondarily I aim to provide means for adjusting the device to the shortening of the teeth by wear.

With these ends in view my invention comprises in general a perforated cleaner-bar or plate which rides up and down on the teeth, and a pair of straps which secure said bar movably to the cross-head of the rake; said straps being provided each with a jog or heel adapted to catch over and support the cleaner-bar when the latter is in elevated position and thus hold it out of the way while the rake is working and at the same time to allow the cleaner-bar to readily fall down over the teeth when the rake is raised or reversed; thus automatically cleaning the rake with little or no attention from the operator.

The nature of my invention will best be understood from a consideration of the accompanying drawings, taken in connection with the following detailed description thereof.

Figures 1, 3:
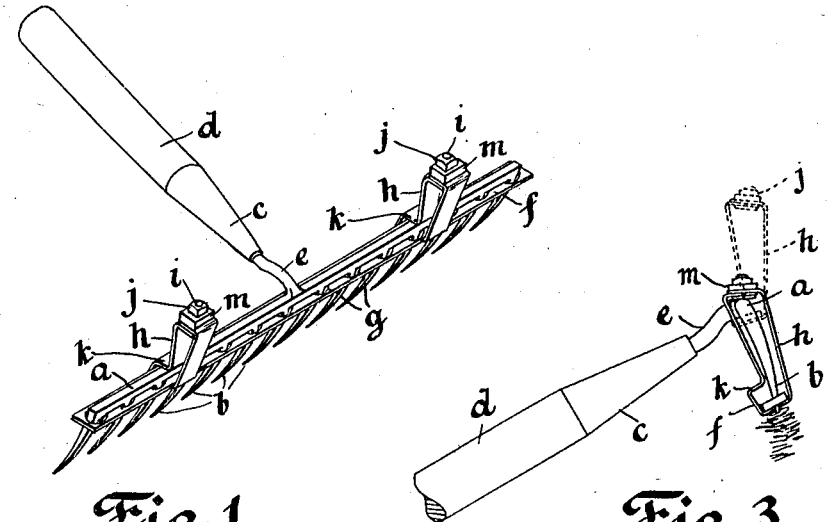
Figure 2:
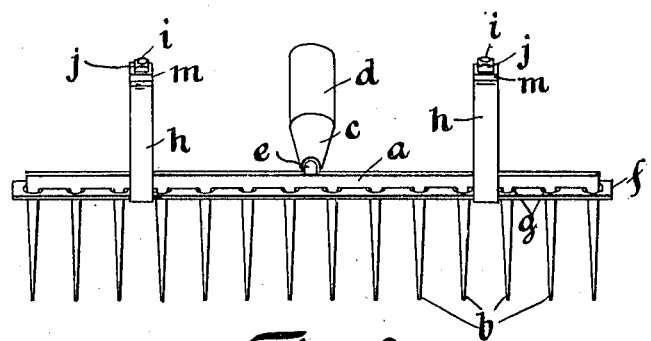
Figure 4:
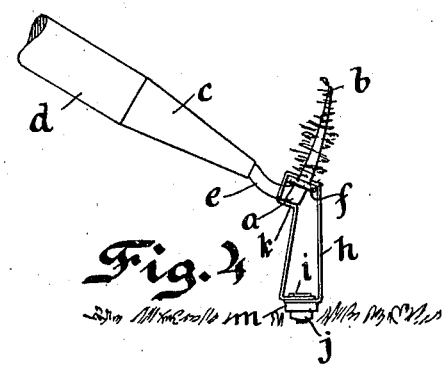
Figure 5:
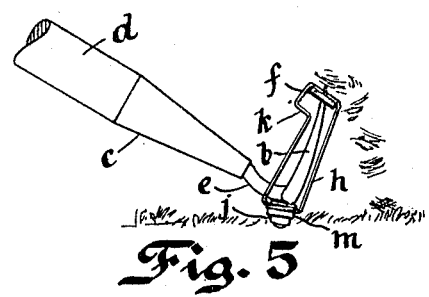

In these drawings Figure 1 is a perspective view of the rake in position of operation; Fig. 2 is a rear elevation thereof in the same position; Fig. 3 is a side view of the rake in raised position to show one way of operating the cleaning-device; and Figs. 4 and 5 are side views of the rake in reversed position with two positions of the cleaning-device, to show another way of operating the latter.

In these drawings every reference numeral refers to the same part in each figure, and in all the figures only the lower portion of the handle is shown, which is all that is essential to the understanding of my invention.

The rake here shown is an ordinary garden-rake having a cross-head or cross-bar $a$, teeth $b$ projecting at right angles therefrom, a socket $c$ in which the handle $d$ is set, and a neck $e$ connecting the socket with the cross-head. It is to be understood that this form of rake is merely shown by way of illustration, as the device may be applied equally well to any of the well known forms of rake in common use.

I provide a cleaning-device consisting of the cleaner-bar $f$ perforated with holes $g$, through which pass severally the teeth $b$; and a pair of straps $h$ secured to the bar $f$ equidistantly from the center, said straps $h$ being of peculiar shape. The ends of said straps overlap at the top (though this is not essential, it being merely necessary that the ends shall be closed so as to hold the plate $f$ in place on the teeth) and detachably held together by a bolt $i$ having a nut $j$. An essential feature of these straps is an inwardly projecting heel $k$ on the handle-side of the rake, which heel is in such position as to catch over the cross-bar $a$ when the cleaner-bar is raised, as shown in Figs. 1 and 2. When in this position it is so held and maintained by gravity, since, the handle being tipped upwardly in use, the center of gravity of the aforesaid straps lies on the back-side of the rake.

Whenever it is desired to clean the teeth from entangled material, either of two methods may be employed. As in Fig. 3, the rake is simply raised obliquely and, the center of gravity of the straps $h$ then lying on the front side of the rake, the latter will drop forward until the heels $k$ clear the cross-bar $a$ and the cleaner-bar drops down into the full-line position, pushing off the entangled material before it. This movement is aided by a slight forward jerk of the rake, and the cleaner is restored either by jerking it up into its former position or by simply lowering the rake and turning it through one complete revolution about the handle as an axis, which will have the same effect.

The other method of using the cleaner is shown in Figs. 4 and 5, and consists in reversing the rake, resting the top of the straps $h$ upon the ground as in Fig. 4, and giving the rake a slight forward push until the cross-bar $a$ clears the heels $k$, whereupon the rake drops into the position in Fig. 5, the plate $f$ again carrying before it the entangled material. Raising the rake from the ground, the cleaning-device again assumes the position of Fig. 4, and will remain in that position when the rake is reversed.

As a means for adjusting the cleaning-device to take up wear of the teeth, so as to prevent the plate $f$ from passing over the ends of the latter, I may employ a block $m$ which when the rake is new is secured under the nut $j$, but when the teeth are worn down somewhat is reversed in position and placed under the head of the bolt $i$. Other additional plates may also be so placed if desirable to take up additional wear from time to time.

The cleaner-device can be readily removed at any time and applied to another rake, or can be applied to any new rake by simply removing the bolt $i$ from the ends of the straps and springing these latter over the cross-bar of the rake.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the scope of my claims.

Having thus described my invention, what I claim as new and desire to secure by Letters Patent is:

1. The combination with a rake of a cleaning-device comprising a cleaner-bar rising and falling on and adapted to sweep the teeth of the rake, and one or more devices mounted on said cleaner-bar having a projected part adapted to catch over the cross-bar of the rake and thus hold said bar in raised position.

2. The combination with a rake of a cleaning-device comprising a cleaner-bar rising and falling on and adapted to sweep the teeth of the rake, and one or more devices mounted on said cleaner-bar having an element projecting over the cross-bar of the rake from the front side when the cleaner-bar is raised, in conjunction with means bringing the center of gravity to the rear of the rake when the parts are in such position and the rake in position of use.

3. In combination with a rake, a cleaner-bar rising and falling on and adapted to sweep the teeth of the rake, a pair of straps mounted on said cleaner-bar and embracing the cross-bar of the rake; and one or more projecting elements mounted on said bar and adapted when the latter is raised to engage over the cross-bar of the rake, being held in that position by gravity when the rake is in position of use.

4. In combination with a rake, a cleaner-bar rising and falling on and adapted to sweep the teeth of the rake, and a pair of straps mounted on said bar and embracing the cross-bar of the rake, each strap having an inwardly projecting element adapted when said bar is in raised position to engage over the cross-bar of the rake and maintain it in said position.

5. In combination with a rake, a cleaner-bar rising and falling on and adapted to sweep the teeth of the rake, and a pair of straps mounted on said bar and embracing the cross-bar of the rake, each strap having an inwardly projecting element adapted when said bar is in raised position to engage over the cross-bar of the rake and maintain it in said position; the center of gravity of the combination being at the rear of the rake in aforesaid position.

6. The combination with a rake of a cleaner-bar rising and falling on and adapted to sweep the teeth of the rake, and a pair of straps limiting the up-and-down movement of said bar in conjunction with rearwardly projecting elements on said straps adapted to engage the cross-bar of the rake from the front side when said bar is in raised position.

7. In a self-cleaning rake, the combination with a rake and the cleaner-bar rising and falling on the teeth thereof, straps secured to said bar and looped over the cross-bar of the rake, spacing-blocks supported on the upper ends of said straps and adapted to lie either outside or inside them, and fastenings adapted to hold said blocks either in the inside or outside position.

8. In combination wth a rake, a cleaner-bar rising and falling on and adapted to sweep the teeth of the rake, a pair of straps mounted on said bar and having their ends overlapping above the cross-bar of said rake, each strap having a rearwardly projecting element on its forward side adapted to engage over the cross-bar of the rake when the cleaner-bar is in raised position, and screw-fastenings securing said overlapping ends together.

9. In combination with a rake, a cleaner-bar rising and falling on and adapted to sweep the teeth of the rake, a pair of straps mounted on said bar and having their ends overlapping above the cross-bar of said rake, each strap having a rearwardly projecting element on its forward side adapted to engage over the cross-bar of the rake when the cleaner-bar is in raised position, screw-fastenings securing said overlapping ends together, and spacing-blocks secured by said screw-fastenings to said straps and adapted to occupy a position either on the outside or inside of said overlapping ends.

In witness whereof I have hereunto set my hand this thirty-first day of March, 1910.

ALFRED S. HESS.

Witnesses:
MARTIN J. ANNEN,
WILLIAM E. SPROTTE.